United States Patent [19]

Riggle

[11] Patent Number: 5,378,179

[45] Date of Patent: Jan. 3, 1995

[54] STEERING APPARATUS AND METHOD FOR MAKING SAME

[75] Inventor: Russell K. Riggle, Necomerstown, Ohio

[73] Assignee: IMO Industries, Inc., Hudson, Ohio

[21] Appl. No.: 192,445

[22] Filed: Feb. 7, 1994

[51] Int. Cl.[6] .............................................. B63H 5/12
[52] U.S. Cl. .......................................... 440/62; 440/59
[58] Field of Search ................... 74/999, 501.6, 497, 74/55, 56, 57, 59, 89.15; 474/152, 166; 244/233; 114/144 R, 154–158, 160, 161; 440/59, 62, 58

[56] References Cited

U.S. PATENT DOCUMENTS

| | | | |
|---|---|---|---|
| 418,032 | 12/1889 | Lake et al. | 114/144 R |
| 511,989 | 1/1894 | Bernstein | 114/144 R |
| 2,175,627 | 10/1939 | Fischel et al. | 192/48 |
| 2,424,889 | 7/1947 | Holmes | 244/233 |
| 2,495,536 | 1/1950 | Morse | 114/144 |
| 2,588,891 | 3/1952 | Spradlin | 74/501.6 |
| 2,865,217 | 12/1958 | Bishop | 74/497 |
| 3,007,429 | 11/1961 | Sandman | 114/160 |
| 3,050,025 | 8/1962 | Atkeson | 114/144 R |
| 3,202,125 | 8/1965 | Morse | 115/35 |
| 3,208,300 | 9/1965 | Morse | 74/498 |
| 3,237,480 | 3/1966 | Phelon | 474/166 |
| 3,344,685 | 10/1967 | Crouzet | 74/57 |
| 3,470,762 | 10/1969 | Houk | 74/502 |
| 3,760,641 | 9/1973 | Espasa | 74/57 |
| 3,808,907 | 5/1974 | Yamaguchi | 74/501.6 |
| 3,832,967 | 9/1974 | Waner et al. | 114/144 R |
| 3,870,007 | 3/1975 | Morse | 114/160 |
| 3,934,488 | 1/1976 | Cantley | 74/493 |
| 4,013,034 | 3/1977 | Cantley | 116/31 |
| 4,014,281 | 3/1977 | Hemens | 114/144 R |
| 4,241,687 | 12/1980 | DuBois et al. | 440/63 |
| 4,323,353 | 4/1982 | Kirkwood | 440/63 |
| 4,483,682 | 11/1984 | Cavil et al. | 440/53 |
| 4,501,218 | 2/1985 | Teraura et al. | 114/144 R |
| 4,605,377 | 8/1986 | Wernstadt | 440/61 |
| 4,723,500 | 2/1988 | Havins, Sr. | 114/144 R |
| 4,735,165 | 4/1988 | Baba et al. | 114/144 R |
| 4,909,765 | 3/1990 | Riske et al. | 440/59 |
| 4,961,392 | 10/1990 | Ballard | 114/161 |
| 5,018,469 | 5/1991 | Carlson | 114/144 R |
| 5,049,082 | 9/1991 | Carter | 439/15 |
| 5,083,951 | 1/1992 | Baba | 440/86 |
| 5,136,894 | 8/1992 | Carter et al. | 74/493 |

FOREIGN PATENT DOCUMENTS 7603399-2  4/1983  Denmark .

*Primary Examiner*—Edwin L. Swinehart
*Attorney, Agent, or Firm*—Jansson & Shupe. Ltd.

[57] ABSTRACT

Disclosed is an apparatus having an input device (e.g., a steering wheel) which rotates about an input axis and moves an output device which provides a force along a force axis. The devices are coupled together by a cam follower mechanism which converts input torque to an "output" linear force exerted by a flexible cable or rigid rod acting along the force axis. When flexible cable is used, it can be mounted concealed in the hull of a boat, for example, and coupled to a steering-type jet nozzle or steering rudder. Thus, rotation of the steering wheel is used to manipulate the nozzle or rudder position. When manufactured, the cam follower mechanism is readily configured to provide any, some or all of a number of custom features as described herein. A new method is also disclosed.

10 Claims, 10 Drawing Sheets

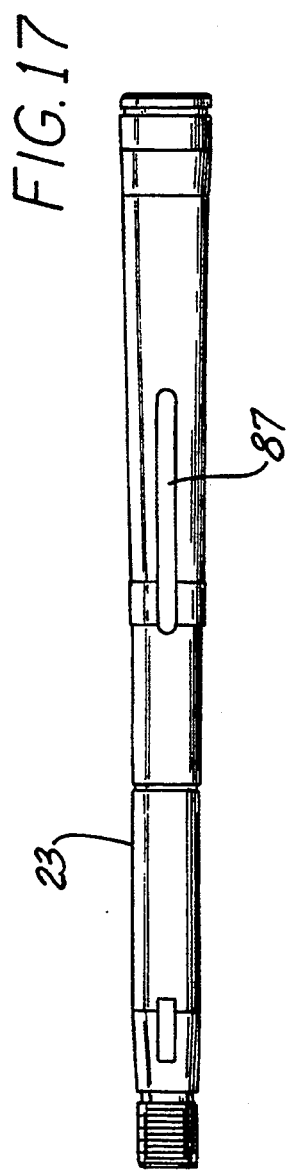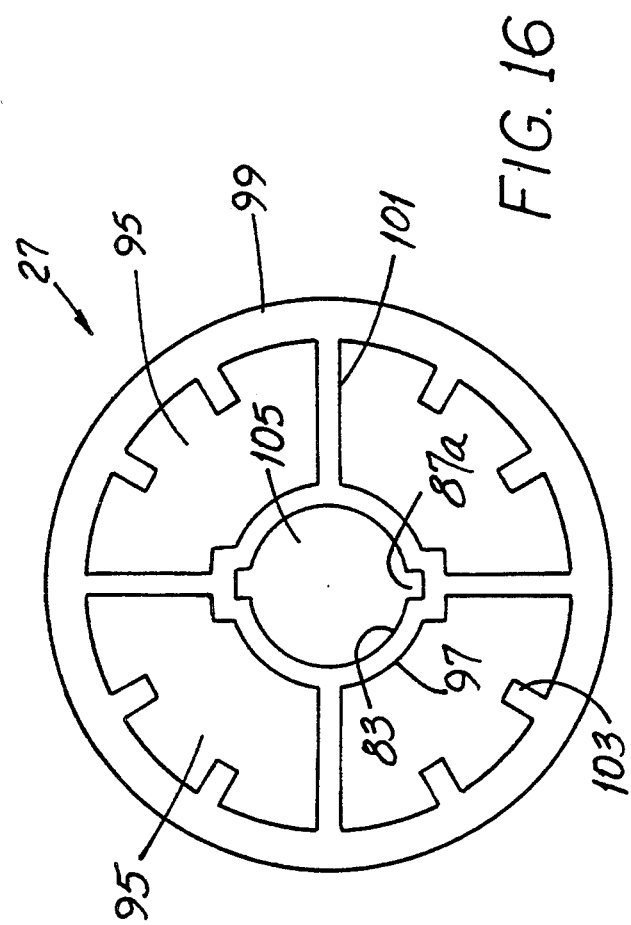

STEERING APPARATUS AND METHOD FOR MAKING SAME

FIELD OF THE INVENTION

This invention is related generally to machine elements and mechanisms and, more particularly, to steering apparatus.

BACKGROUND OF THE INVENTION

Steering apparatus and systems are used for a wide variety of applications from the simplest, that of a bicycle or tricycle, to complex systems used to steer large aircraft and seagoing vessels. As the "human input device," such systems may use simple handlebars, a lever-like tiller with freedom of movement in one or two axes, or a steering wheel or steering segment, i.e., a portion of a wheel, the latter as often used on aircraft. A steering segment or wheel is popular since its motion and the result of such motion, vehicle steering left or right, is very familiar to drivers of motor vehicles.

A reason for such popularity is that use of a steering wheel is almost intuitive. One is far less likely to make a steering error when using a steering wheel than, for example, when using a push-pull rod. Recalling whether "in" or "out" movement of such rod provides left or right direction steering can be problematic, especially in an emergency steering situation.

Notwithstanding the popularity and obvious utility of the wheel as a steering device, the "end function" component, e.g., a steerable boat jet or rudder, often requires application of linear force and resulting linear movement to effect steering. This fact is recognized by certain prior art steering apparatus such as depicted in U.S. Pat. Nos. 5,018,469 (Carlson) and 4,501,218 (Teraura et al.). The Carlson and Teraura et al. patents both show rack-and-pinion drives for converting rotary motion into linear motion.

A pinion-drive steering apparatus is depicted in a document titled "New Jet Boat Steerer" by Morse Controls Div. IMO Industries. Such apparatus provides diminishing steering forces and reduced steering rate as the steering wheel is turned farther from its center position.

While these earlier steering apparatus have been generally suitable for their intended purpose, they have certain disadvantages. One such disadvantage is that they are relatively expensive to manufacture. Of course, higher manufacturing costs translate into higher selling prices, a fact which users of such apparatus prefer to avoid. As examples, worm gear drives and rack-and-pinion drives require several carefully machined, "close tolerance" parts. And equipment for cutting gear teeth is relatively expensive.

Yet another disadvantage relates to "design flexibility." The purchaser of the apparatus, e.g., an original equipment manufacturer (OEM) of boats, is likely to have varying requirements relating to steering torque, magnitude of output force, stroke length, direction of output stroke for a given direction of steering wheel rotation, and so forth, depending upon the size and type of boat and the configuration of its drive components. When the steering apparatus uses gear-like parts, it is difficult to configure the apparatus to meet a broad range of requirements of the type noted above.

Still another disadvantage arises from certain specific types of geared steering apparatus. Here are some examples. A rack-and-pinion steering apparatus (of the type depicted in the above-noted Carlson patent) or a cable-and-pulley apparatus as shown in U.S. Pat. No. 5,136,894 (Carter et al.) provides output force and motion along an axis which is 90° to the long axis of the steering column shaft. Many applications are better suited for an arrangement in which the output force is available along an axis parallel to the steering column shaft.

Other disadvantages relate to aspects of "steering rate," i.e., the length of linear movement of the output device for a given number of degrees of rotation of the input device, e.g., the steering wheel. Steering apparatus of the worm drive type seemingly require several revolutions of the steering wheel to produce a relatively short output movement. The diminished steering rate characteristic of the apparatus depicted in the Morse Controls document may be unsuited for certain jet boat applications which need increased steering rate with greater excursions of the steering wheel from center. And in any event, the known prior art does not offer "variable rate" steering, i.e., a steering rate which changes depending upon how far the steering wheel is rotated from a "straight ahead" or center position.

Yet another disadvantage to certain of the prior art steering apparatus relates to size and weight. They are simply too heavy, cumbersome and bulky to be of much value in, say, small water craft and ultralight aircraft. And weight and bulk often imply difficulty in repair.

An improved steering apparatus which addresses the aforementioned disadvantages would be an important advance in the art.

OBJECTS OF THE INVENTION

It is an object of this invention to provide an improved steering apparatus overcoming some of the problems and shortcomings of apparatus of the prior art.

Another object of this invention is to provide an improved steering apparatus which is relatively small in size, light in weight and relatively easy to manufacture.

Another object of this invention is to provide an improved steering apparatus which is readily configured for specific customer application requirements relating to available output force, stroke length, stroke direction and steering rate for a given steering wheel rotation.

Yet another object of this invention is to provide an improved steering apparatus which is readily configured to provide constant rate or variable rate steering.

Another object of this invention is to provide an improved steering apparatus which is very easy to repair.

Still another object of this invention is to provide an improved steering apparatus providing output force and motion along an axis generally parallel to the input shaft to which a steering wheel or segment is attached.

How these and other objects are accomplished will be apparent from the following descriptions and from the drawing.

SUMMARY OF THE INVENTION

In general, the invention involves an apparatus having an input device (such as a steering wheel) which rotates about an input axis and an output device which provides a force along a force axis. In the improvement, the devices are coupled together by a cam follower mechanism which changes the input torque (applied by the human "driver" to the exemplary steering wheel) to a linear output force acting along the force axis.

But one of many applications for the invention is a boat propelled and steered by a pivot-mounted water jet. The output force is used to manipulate the position of the jet and steer the boat. Another application is ultralight aircraft where the invention is used for manipulating the position of air flow control surfaces.

More specifically, the cam follower mechanism includes a cam portion and a follower member engaging the cam portion. In a way described in detail below, the cam portion and the follower member coact to provide the linearly-acting output force used for steering. The cam portion is on a cylindrical drum mounted for rotation about the input axis. When the drum is rotated, the cam portion (being at the surface of the drum) moves in an arc spaced from the input axis.

The cam portion has an angled face exerting an actuating force on the follower member. In one exemplary embodiment, the cam portion comprises a groove in the drum, the face is on a side of the groove and the follower member comprises a component engaging the groove. The output device includes a rod coupled to the disc and providing the linear force. The groove-following component may be a disc, square or oval block or the like.

In another exemplary embodiment, the cam portion comprises an outwardly-extending land on the drum, the face is on the side of the land and the follower member comprises a saddle-like follower engaging the land and coupled to the rod.

In another aspect of the invention, the input device includes a tapered drive shaft and the mechanism includes a tapered drive socket formed in the drum. The shaft and the socket are conformably tapered to fit tightly together "wedge-like" for torque-transmitting shaft-socket engagement. In a highly preferred embodiment, the drive shaft and the drive socket are also redundantly coupled together by at least one bar-like "key." Such key extends between the shaft and the socket and interlocks the shaft and the drum for preventing relative shaft-drum rotation.

In yet another aspect of the invention, the drive shaft is mounted on a support bracket for rotating movement with respect to such bracket. The follower member is supported by the bracket and guided for linear motion.

More specifically, the follower member is attached to a guide. The bracket has a pair of spaced legs and the guide is mounted on a pair of elongate, shaft-like guide rails which, in turn, are mounted to and supported by such bracket legs. This arrangement permits sliding linear movement of the guide on and along the rails. And with the rod coupled to the guide, there is linear rod movement coincident with movement of the guide.

In another aspect, the new apparatus also has an input shaft support collar near the steering wheel, i.e., positioned to support the shaft as the wheel is turned. The mechanism drive shaft extends through a bracket leg and the rotating drum is adjacent to the same leg. Such leg is "sandwiched" or interposed between the drum and the support collar so that the input shaft is well supported against lateral forces. Such forces are inadvertently but almost inevitably imposed upon such shaft while turning the steering wheel. It is to be appreciated that the bracket and support collar may be molded as a unitary structure.

And that is not all. The new apparatus may be configured to provide constant or variable rate steering. In an arrangement for constant rate steering, the cam portion defines an included angle to a reference line which is on the drum surface and spaced from the input axis. The angle is substantially constant along the length of the cam portion and provides constant rate steering, i.e., steering which provides the same stroke length (e.g., 0.3 inches) for each unit (e.g., 13.5°) of steering wheel rotation.

In an arrangement for variable rate steering, the cam portion has a first segment defining a first included angle with a first reference line. Such cam portion also has a second segment defining a second included angle with a second reference line and the angles differ from one another.

Other aspects of the invention involve a method for making a steering apparatus having a cam portion on a drum. The method includes the steps of providing a drum having a generally smooth surface, analyzing a specification describing a steering rate to be provided by the apparatus and machining a groove in the drum surface so that the rate of steering provided by the apparatus is in conformity with the specification.

To make a constant rate steering apparatus, the machining step includes machining the groove so that such groove is at a substantially constant angle to a reference line which is (a) on the drum surface and (b) parallel to the input axis. To make a variable rate steering apparatus, the machining step includes machining the groove to have plural segments. Such machining is in a way that each segment is at a different angle to an imaginary reference line which is on the drum surface and parallel to the input axis.

Other details of the inventive steering apparatus and method are set forth in the following detailed description and in the drawing.

BRIEF DESCRIPTION OF THE DRAWING

" FIG. 7 illustrates principles relating to constant rate steering.

FIG. 16 is an end view of another embodiment of the drum of the apparatus. Such view is generally like that taken along the viewing plane 5—5 of FIG. 4.

FIG. 17 is a view of another embodiment of an apparatus drive shaft.

DETAILED DESCRIPTION OF THE PREFERRED EMBODIMENTS

Figure 1:
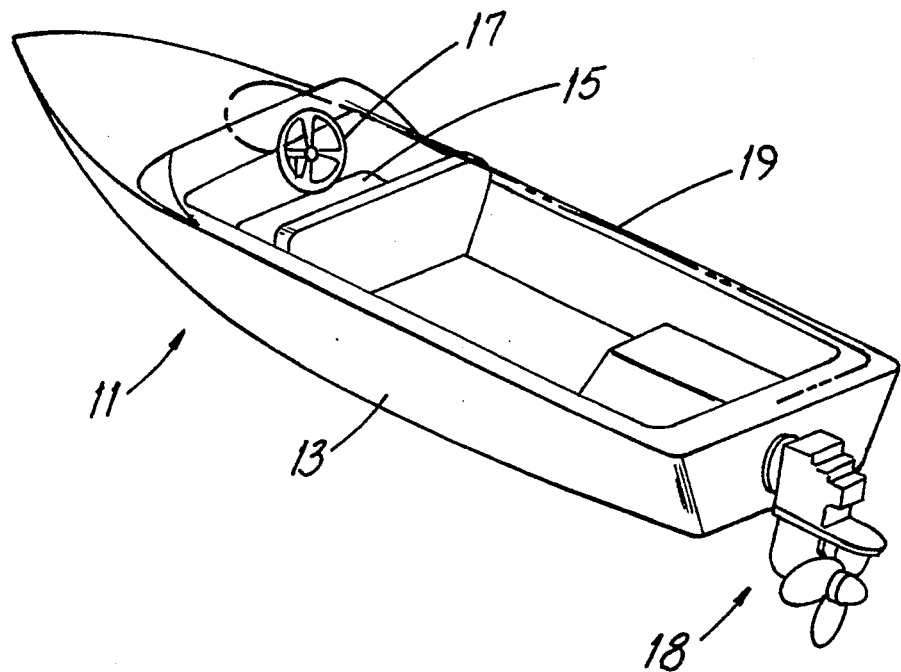
FIG. 1 is a perspective view of a boat having a steering wheel and a propulsion unit.

Before describing details of the inventive apparatus 10 and method, it will be helpful to have an understanding of an exemplary application for which the apparatus 10 is used. Referring to FIG. 1, an exemplary boat 11 includes a hull 13, an operator's seat 15 and a wheel 17 for steering the boat 11. A steerable propulsion unit 18, e.g., an outboard motor or steerable jet, is mounted at the boat stern.

The boat 11 is equipped with the improved apparatus 10 and a flexible control cable 19 extends between such apparatus 10 and the propulsion unit 18 itself or some other mechanism, e.g., a rudder, for steering. When the steering wheel 17 is rotated, the boat 11 is steered.

There are at least two advantages to this arrangement. One is that the operator faces straight ahead as when driving an auto. Another is that the flexible control cable 19 is concealed within the hull 13 to enhance the aesthetics of the boat 11.

Figure 3:
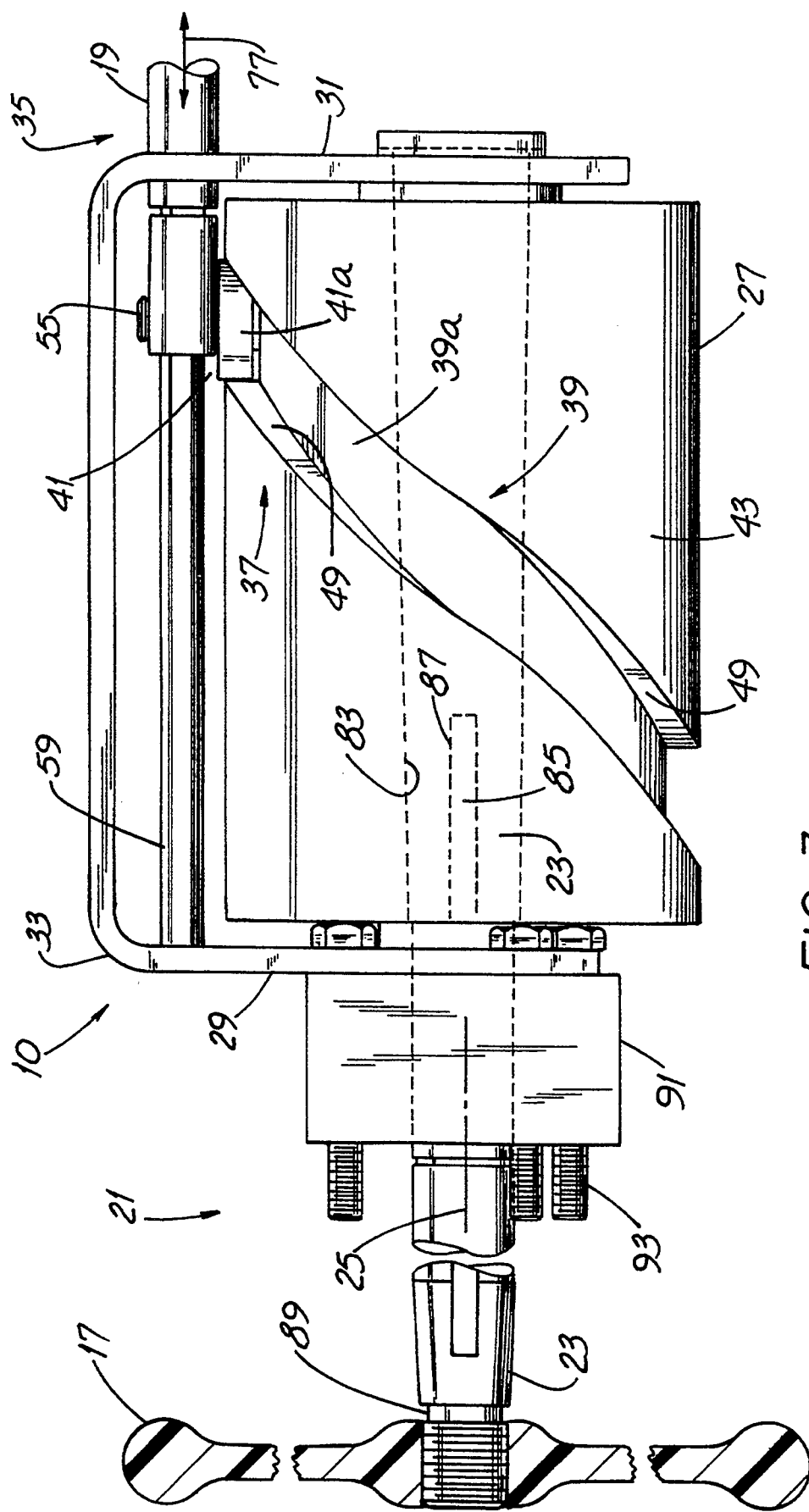
FIG. 3 is a plan view of an embodiment of the steering apparatus. Parts are shown in cross-section, other parts are broken away and surfaces of parts are shown in dashed outline.

Referring also to FIG. 3, the components of the improved apparatus 10 will now be described. The apparatus 10 has an input device 21 comprising the steering wheel 17 and the input shaft 23 to which the wheel 17 is mounted. The shaft 23 extends along an input axis 25 and both the wheel 17 and shaft 23 are concentric with such axis 25. In turn, the shaft 23 is coupled to a generally cylindrical drum 27 (which is also concentric with such axis 25) and the shaft 23 and drum 25 are supported for rotation between two spaced legs 29, 31 of a support bracket 33.

Figure 2:
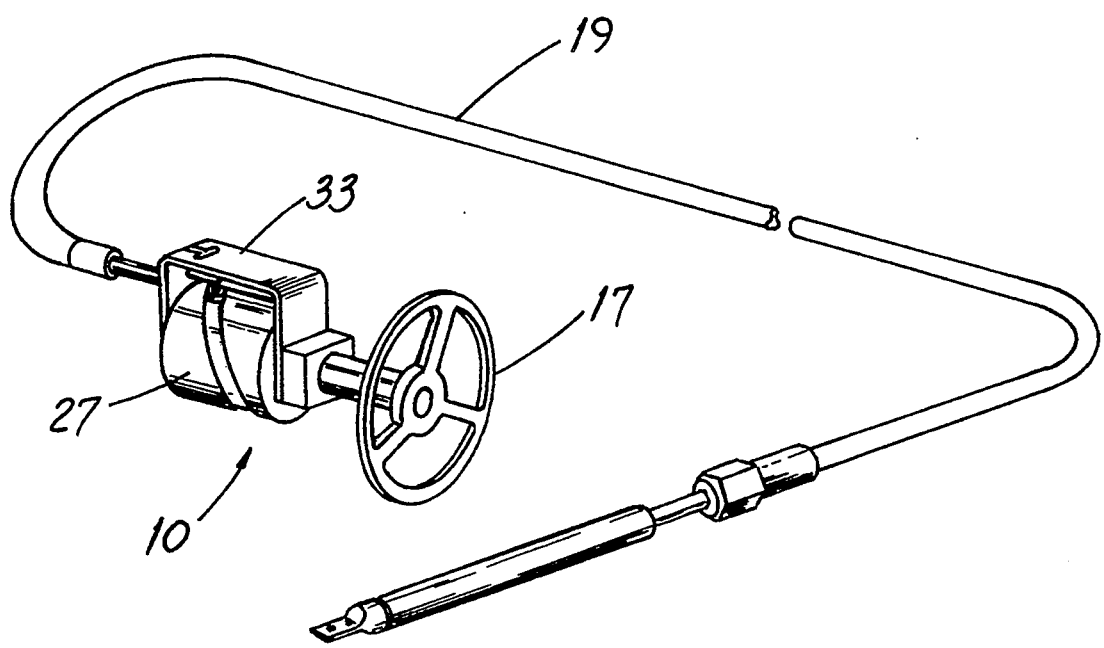
FIG. 2 is a representative perspective view of the inventive steering apparatus shown in conjunction with a flexible cable for controlling a propulsion unit.

The apparatus 10 also has an output device 35 such as a cable 19 having a flexible linearly-movable core and an outer protective conduit surrounding the core. As shown in FIGS. 1 and 2, the illustrated flexible cable 19 is ideal for easy concealed placement within the boat 11. And, of course, the output device 35 may simply be a rigid rod 35A. In many jet boats, steering force is exerted "fore and aft," i.e., along the centerline of the boat 11. Thus, the apparatus 10 can be installed using but one 180° bend in the cable 19. Avoidance of cable bends helps reduce cable "backlash."

Figure 4:
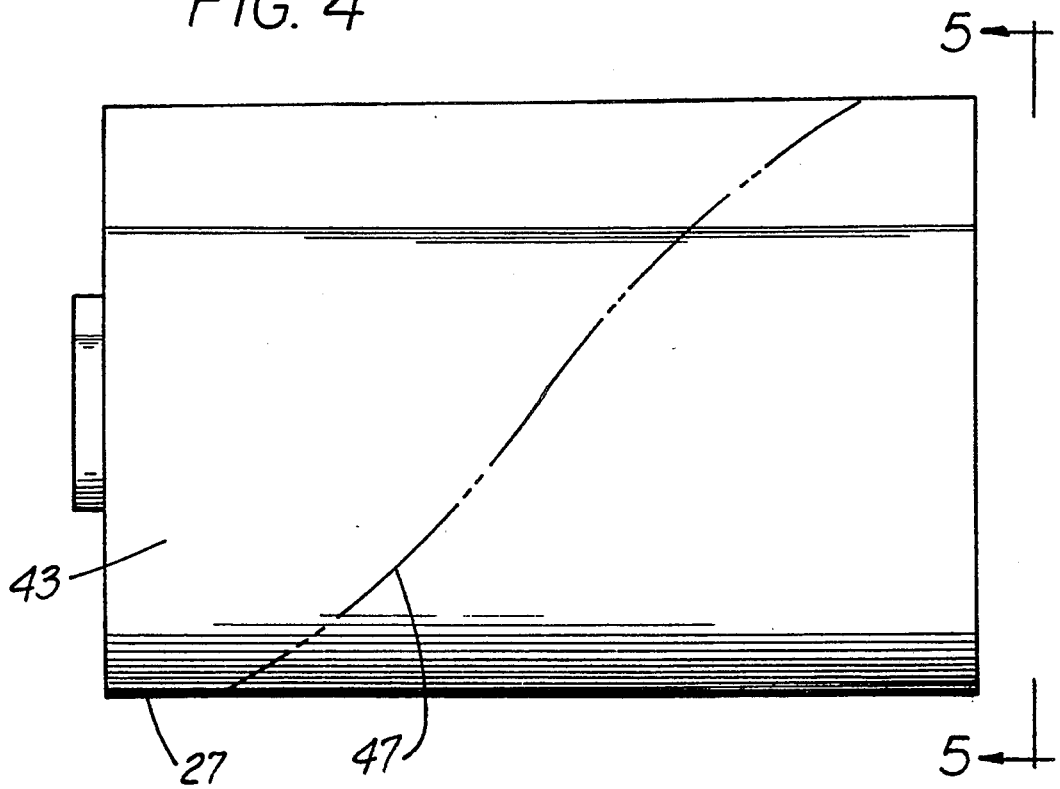
FIG. 4 is a plan view of the drum component of the steering apparatus of FIG. 3. The orientation of such component is reversed end-for-end from that shown in FIG. 3.
Figure 5:
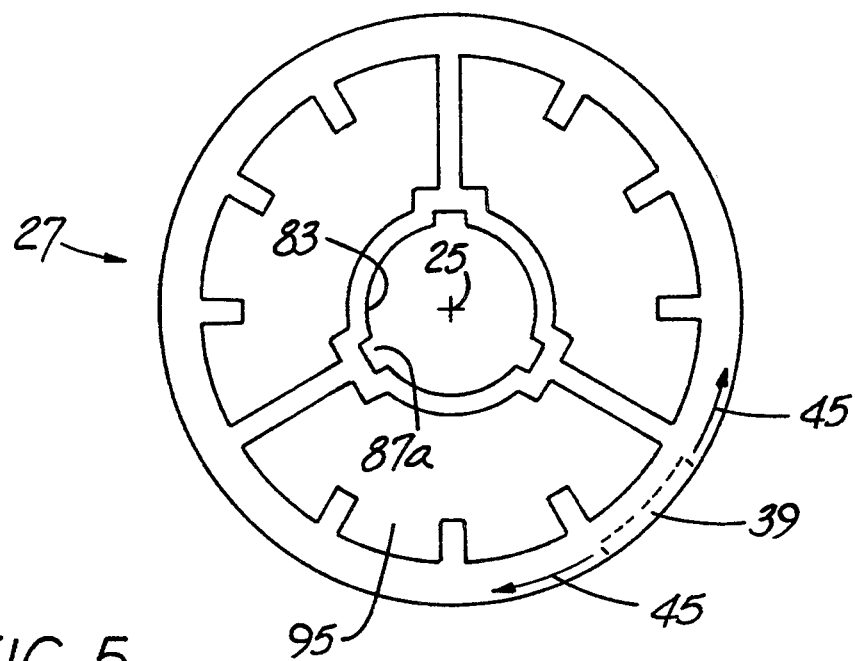
FIG. 5 is an end view of one embodiment of the drum taken generally along the viewing plane 5—5 of FIG. 4.
Figure 10:
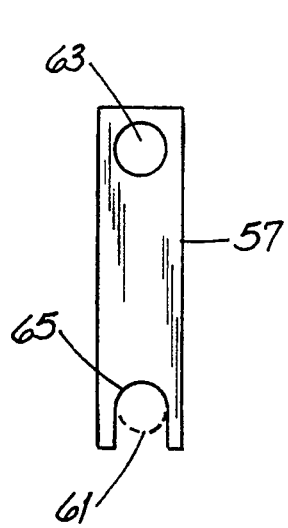
FIG. 10 is an elevation view of the guide of FIG. 9 taken generally along the viewing plane 10—10 of FIG. 9. A rail is shown in dashed outline.
Figure 9:
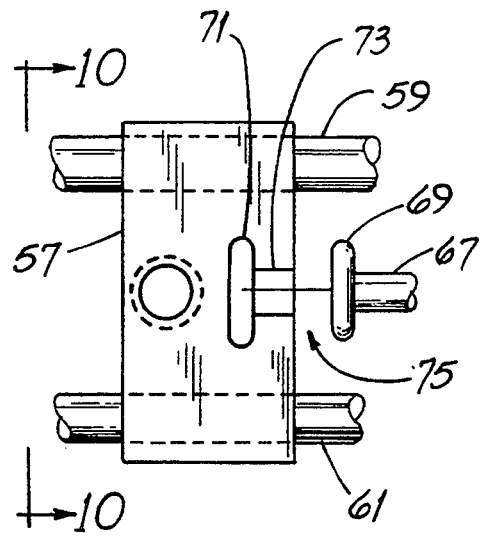
FIG. 9 is an elevation view of a guide component of the apparatus mounted on a pair of guiding rails. Parts are broken away and surfaces of parts are shown in dashed outline.
Figure 6:
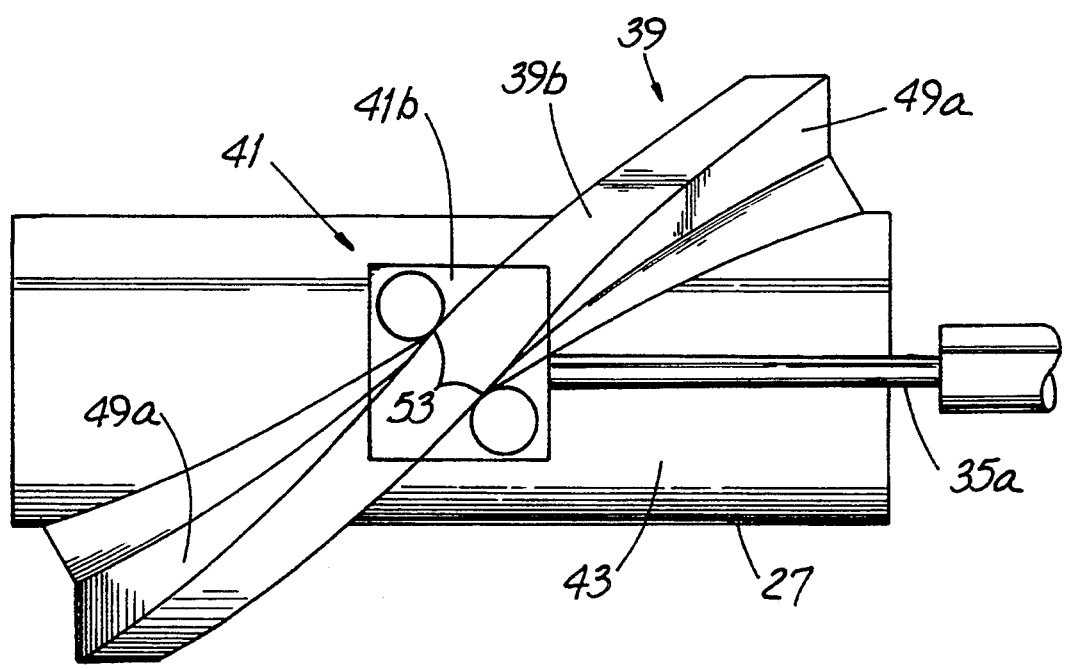
FIG. 6 is a representative plan view of another embodiment of the steering apparatus. Parts are omitted for clarity and other parts are broken away.

Referring also to FIGS. 4, 5 and 6, the devices 21, 35 are coupled together by a cam follower mechanism 37 having a cam portion 39 and a follower member 41 engaging such portion 39. Because the cam portion 39 is on the cylindrical surface 43 of the drum 27, such cam portion 39 moves in an arc spaced from the input axis 25. In FIG. 5, the arc is represented by the arrows 45 and in FIG. 4, the cam portion 39 is represented by a cam portion center line 47.

Figure 7:
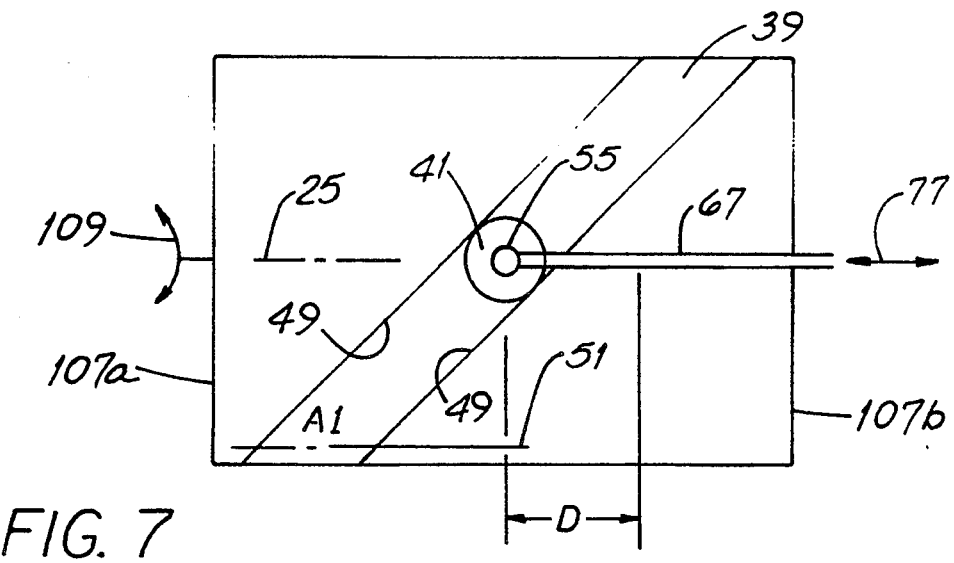
FIG. 7 is a developed view of a drum of the apparatus, i.e., a view as if the drum had been cut longitudinally along its cylindrical surface and "laid out flat.
Figure 8:
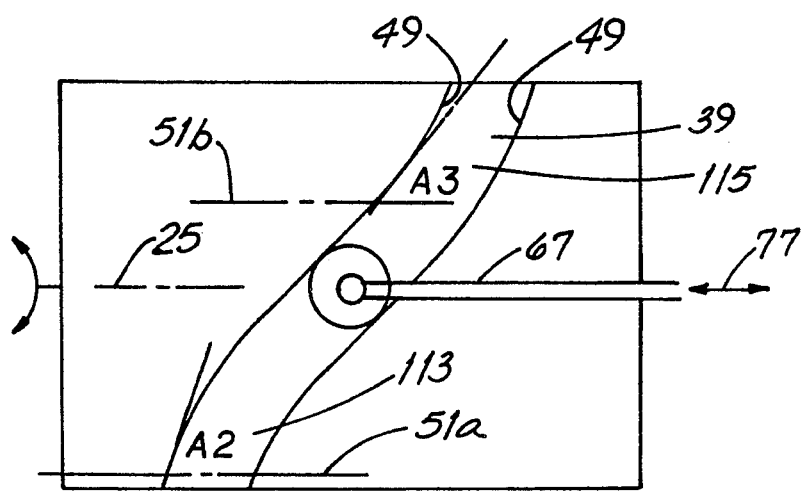
FIG. 8 is another developed view of a drum of the apparatus which illustrates principles relating to variable rate steering.

In the embodiment of FIG. 3, the cam portion 39 comprises a groove 39a in the drum 27 and the follower member 41 comprises a component 41a embodied as a disc engaging the groove 39a. Such groove 39a is cut to a generally uniform depth and is bounded laterally by faces 49, one or the other of which exerts force on the follower member 41 as described below. As shown in FIGS. 7 and 8, the faces are at an angle with respect to an imaginary reference line on the drum surface and parallel to the input axis 25.

In the embodiment of FIG. 6, the cam portion 39 comprises an outwardly-projecting land 39b on the drum 27 and the follower member 41 comprises a saddle-like follower 41b engaging the land 39b. Such follower 41b has a pair of spaced curved surfaces 59, one of which contacts a separate face 49a of the land 39b. For reasons that will become apparent, the embodiment of FIGS. 3, 7 and 8 is most highly preferred. And it should be appreciated that like the faces 49 of the groove 39a, the faces 49a of the land 39b are at an angle with respect to the above-noted reference line 51.

Referring again to FIGS. 3 and to FIGS. 9–13, the follower member 41 is pivotably mounted by a pin 55 to a guide 57 supported by the bracket 33 for linear motion substantially along the length of the drum 27. Such guide 57 is supported on the bracket 33 by a pair of elongate, parallel, shaft-like rails 59, 61 which extend between and are attached to the spaced bracket legs 29, 31. One rail 59 extends through the aperture 63 in the guide 57 and the other rail 61 is received in the "U"-shaped notch 65 in the guide 57. When so mounted, the guide 57 is free to move linearly along the rails 61 (and parallel to the input axis 25) but is restrained from rotating about any axis.

The flexible cable 19 is terminated in a rigid rod 67 having an enlarged mushroom head 69. The rod 67 and the guide 57 are coupled to one another by inserting the rod 67 and head 69 into the "top" 71 and "leg," 73 respectively, of the T-shaped slot 75. The rod 67 thereupon moves along an output force axis 77, such movement being coincident with and proportional to movement of the guide 57.

Figure 11:
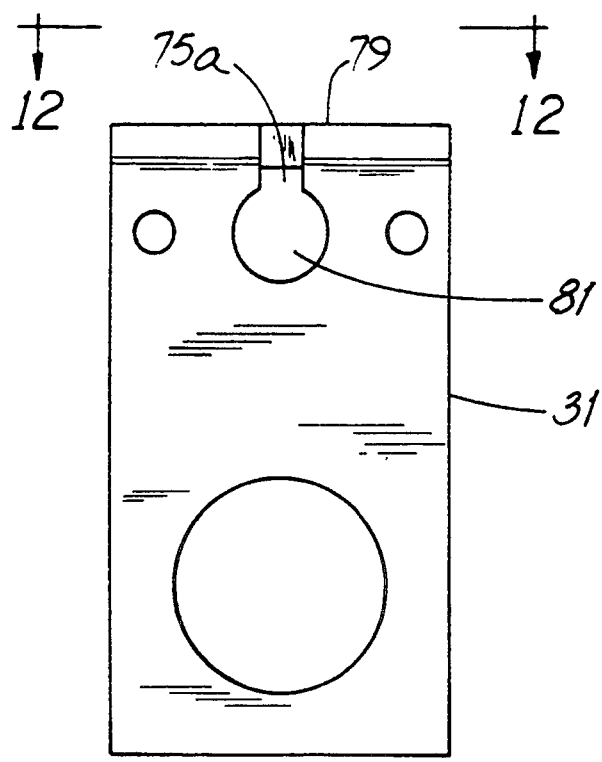
FIG. 11 is an end elevation view of the support bracket component of the apparatus of FIG. 3.
Figures 12, 13:
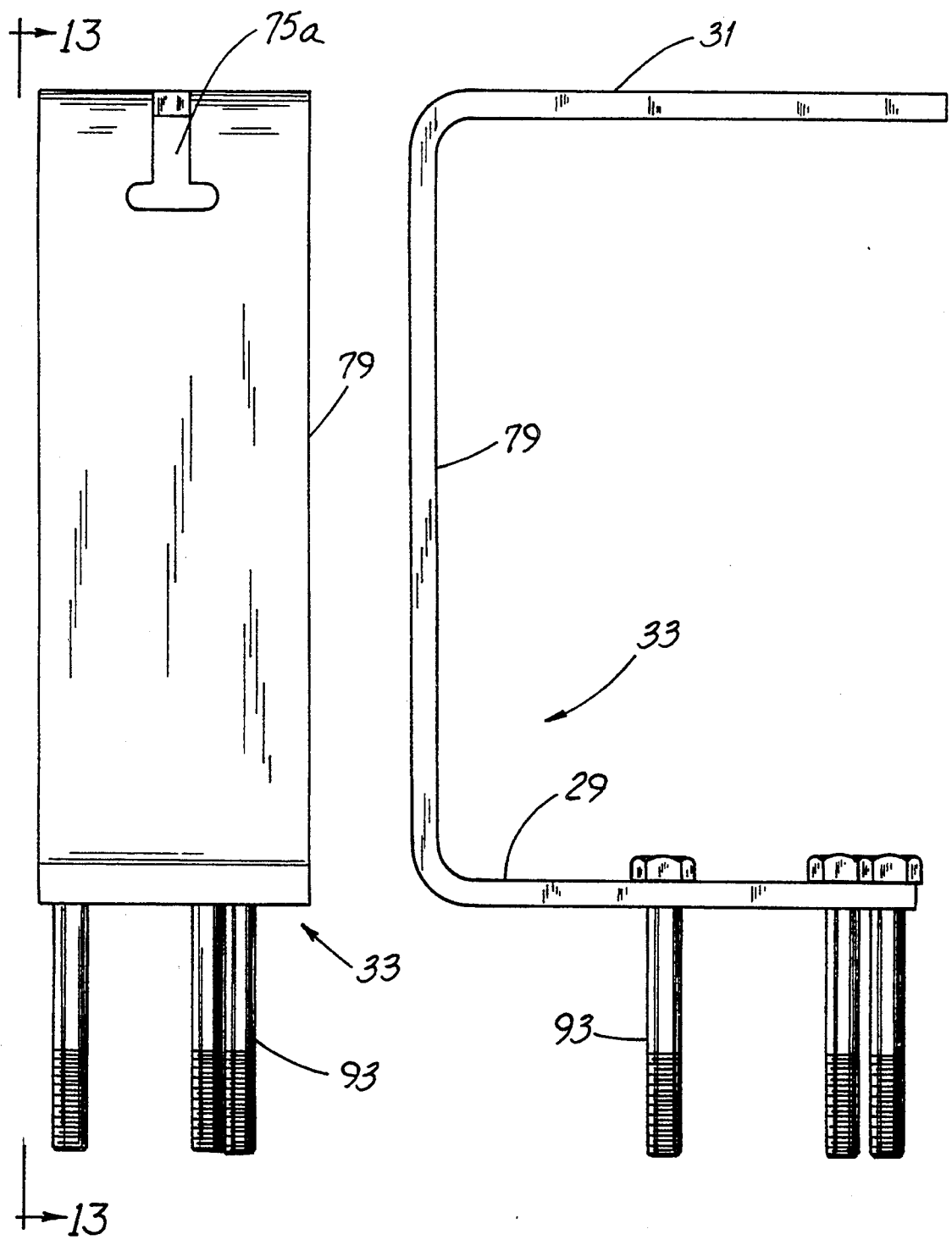
FIG. 12 is a plan view of the support bracket of FIG. 11 taken generally along the viewing plane 12—12 of FIG. 11.
FIG. 13 is a side elevation view of the support bracket taken generally along the viewing plane 13—13 of FIG. 12.

Using a mushroom head 69 and T-shaped slot 75 makes assembly very quick and easy. And as shown in FIGS. 11 and 12, that approach is also used in the bracket 33 in that the main bracket panel 79 has a similar T-shaped slot 75a which joins with a keyhole slot in the leg. The mushroom head 69 is inserted through the slot 79a and the rod 67 is in the hole 81.

Figure 14:
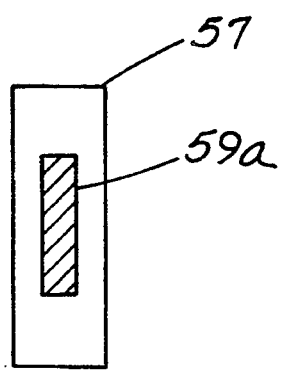
FIG. 14 is an end view of another embodiment of a guide and support rail.
Figure 15:
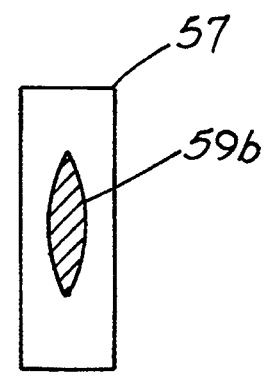
FIG. 15 is an end view of yet another embodiment of a guide and support rail.

In other embodiments shown in FIGS. 14 and 15, the guide is supported on a single elongate rail 59, the cross-sectional shape of which is other than circular. Merely as examples, the shape of the rail 59a of FIG. 14 is rectangular while that of the rail 59b of FIG. 15 is generally ovoid. Such non-circular cross-sectional shapes are sometimes referred to as "torque-transmitting" shapes. That is, unlike a cylindrical rail 59, the rails 59a, 59b of FIGS. 14 and 15 need no set screw, friction fit, or the like to prevent the guide 57 from moving in any way except sliding along the rail 59a, 59b—the rail shape alone prevents rotation of the guide 57 about the rail 59a, 59b.

Referring again to FIGS. 3 and 5, it is to be noted that the elongate drum drive socket 83 and the input drive shaft 23 are conformably tapered. That is, they have about the same angle of taper and about 1° included angle measured from the axis 25 to the surface of the socket 83 is preferred. In that way, the shaft 23 and socket 83 may be urged tightly together "wedge-like" so that torque may be transmitted from the shaft 23 to the drum 27 by friction fit alone.

However, in a highly preferred embodiment, the shaft 23 and drum 27 are redundantly prevented from relative rotation by one or more keys 85. Each such key 85 fits into a keyway 87 in the shaft 23 and a counterpart keyway 87a in the drum 27 so that the shaft 23 and drum 27 are interlocked to prevent relative shaft-drum rotation.

Referring again to FIG. 3, since the steering wheel 17 is mounted on the end 89 of the shaft 23, that portion of the shaft 23 between such wheel and the bracket leg 29 is subject to some lateral bending forces. Such forces are naturally (and almost unavoidably) imposed on the apparatus 10 during steering or, perhaps, while climbing into or out of the seat 15. In a highly preferred embodiment, the apparatus 10 includes a support collar 91 receiving the shaft 23 therethrough with slight clearance. If provided as a separate piece rather than integrally molded with the bracket 33 as mentioned above, such collar 91 is mounted by bolts 93 to the leg 29 so that the leg 29 is interposed between the drum 27 and the support collar 91.

Some additional details regarding the configuration of the drum 27 and shaft 33 will now be set forth. As shown in FIG. 16, the drum 27 is generally hollow and has four interior cavities 95 (each spanning about 90°), an interior hub 97, an exterior perimeter section 99 and a plurality of rigid webs 101 extending radially, i.e., "spoke-like," between the hub 97 and the section 99. The socket 83 through which the drive shaft 23 extends is formed in the hub 97.

The perimeter section 99 also has several radially inward projecting reinforcing ribs 103 which helps the drum 27 retain its cylindrical shape when the apparatus 10 is in use. The ribs 103 (or a rib 103 and a web 101, as the case may be) are spaced about 30° apart. In a highly preferred embodiment, the drum 27 is closed at one end (but for the shaft opening 105), open at the other and made by injection molding.

To effect driving connection with a shaft 23 as described below, the drum 27 includes two interior key slots 87a spaced about 180° apart. As will be recognized by those of ordinary skill in the injection molding arts, the drum 27 has slight "draft" not apparent from the drawing. Such draft permits the drum 27 to be readily withdrawn from the mold. In another embodiment shown in FIG. 5, the drum has three interior cavities 95.

Another embodiment of a shaft 23 is shown in FIG. 17 and includes two keyways 87 spaced about 180° apart. The shaft 23 of FIG. 17 is preferred if such shaft 23 is made by casting and a three-key shaft 23 to fit the drum 27 of FIG. 5 is preferred if such shaft 23 is machined. And, of course, a drum 27 and shaft 23 formed as a unitary structure is contemplated by the invention.

Operation of the apparatus 10 will now be described and such description will be followed by an explanation of several additional features of the new apparatus 10. Particular reference is made to FIGS. 3, 7 and 8.

In operation, it is assumed that the steering wheel 17 is centered (as to its own rotation), the propulsion unit 18 is centered "straight ahead" and the follower member 41 engages the cam portion 39 (whether a groove 39a or a land 39b) at a point about midway between the drum ends 107 as shown in FIGS. 7 and 8. It is also assumed that when viewed from the steering wheel or proximal end 107a, the cam portion 39 runs counterclockwise around the drum 27 as such portion is viewed from the proximal end 107a to the distal end 107b.

Referring particularly to FIG. 7, it is assumed the steering wheel 17 is turned counterclockwise (as represented by the arrowhead 109) a certain number of degrees represented by "X." Since the follower member 41 is restrained by the guide 57 and rail(s) 59 from any but linear motion, such follower member 41 is urged forward (to the right in FIG. 7) along the stroke length distance "D."

Since the length of the cam portion 39 is at a constant angle "A1" with respect to an imaginary reference line 51 on the drum surface 43 and parallel to the input axis 25, the ratio of X:D or D:X is constant. An apparatus 10 configured in this way is said to provide constant rate steering, i.e., steering in which the ratio of steering wheel turning, in degrees rotation, to stroke length "D" is constant.

Figure 18:
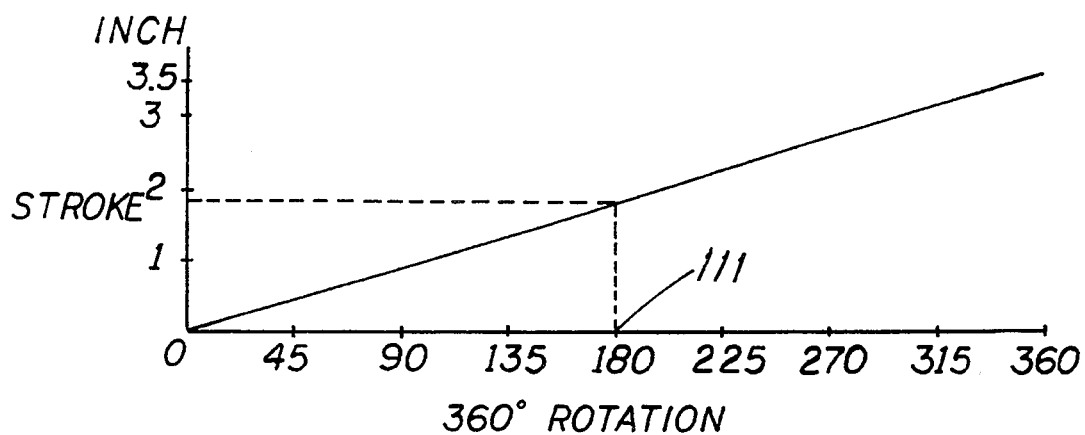
FIG. 18 is a graphic depiction of aspects of a steering apparatus providing constant rate steering.
Figure 19:
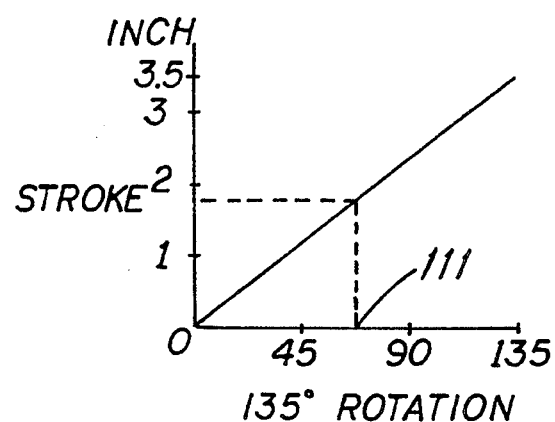
FIG. 19 is a graphic depiction of aspects of another steering apparatus providing constant rate steering at a rate different than that shown in FIG. 18.

FIGS. 18 and 19 depict constant rate steering in graphic form. In each case, a total linear stroke length of about 3.5 inches (about 1.75 inches either side of center) is assumed. The point 111 represents the steering wheel 17 and the propulsion unit 18 or other steered device at their "straight-ahead" positions. From the graph of FIG. 18, it is apparent that the steering wheel 17 can be turned 180° either side of center and the stroke length will be about 1.75 inches either side of center. From the graph of FIG. 19, it is apparent that the steering wheel 17 can be turned 67.5° either side of center and the stroke length will be about 1.75 inches either side of center.

Referring particularly to FIG. 8, in an arrangement for variable rate steering, the cam portion 39 has a first segment 113 defining a first included angle "A2" with a first reference line 51a. Such cam portion 39 also has a second segment 115 defining a second included angle "A3" with a second reference line 51b.

Since the angles A2, A3 differ from one another it is now apparent that using the same analytical approach as used above with respect to FIG. 7, the ratio of X:D or D:X will not be constant but will vary. An apparatus 10 configured as depicted in FIG. 8 is said to provide variable rate steering, i.e., steering in which the ratio of steering wheel turning, in degrees rotation, to stroke length "D" varies. And in the arrangement of FIG. 8, the apparatus 10 steers more rapidly for steering wheel excursions closely adjacent to the center position of the steering wheel 17 than for wheel excursions near the ends of the wheel turning arc.

Figure 20:
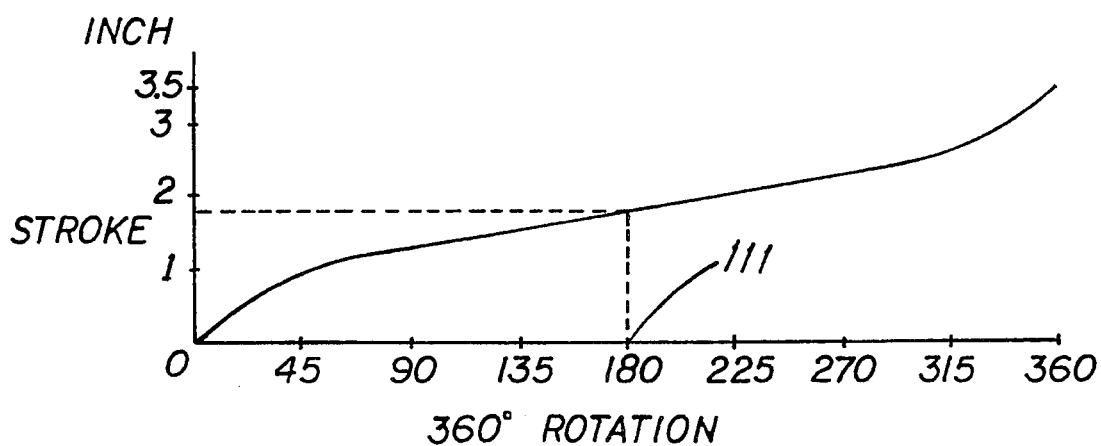
FIG. 20 is a graphic depiction of aspects of a steering apparatus providing variable rate steering.

FIG. 20 depicts variable rate steering in graphic form. However, it is to be noted that the variable rate steering of such FIG. 20 is opposite to that shown in FIG. 8. That is, an apparatus 10 configured as reflected in the graph of FIG. 20 steers more slowly for wheel excursions closely adjacent to the wheel center point 111 position and more rapidly for excursions near the ends of the wheel turning arc. FIG. 20 also assumes a steering wheel capable of 360° rotation "lock to lock" (180° either side of center) and a total stroke length of about 3.5 inches.

From an inspection of FIGS. 7 and 8, it will also now be apparent how the direction of follower member movement can be changed for a particular direction of drum rotation. If the cam portion 39 is oriented to extend from the upper left to the lower right (as viewed in those FIGURES), the follower member 41 is urged to the left, rather than to the right, with counterclockwise rotation of the drum 27.

The output force available along the linear force axis 77 will vary with variations in the angles analogous to angles "A1," "A2" and "A3." It will be of interest to understand why this is true. An apparatus 10 having constant steering rate is used in the explanation.

Figure 21:
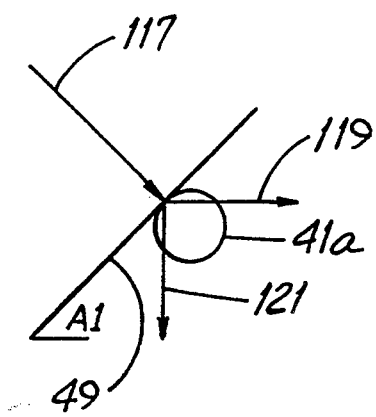
FIGS. 21 and 22 are vector diagrams illustrating how output force changes with changes in the angle of the cam portion.

Referring to FIG. 21, it is assumed that the drum 27 is being rotated by the steering wheel 17 and a groove face 49 at an angle "A1" (to relate FIG. 21 to FIGURE 7) exerts a force on the component 41a. Both the magnitude and direction of the force are represented by the vector 117, magnitude being represented by vector length.

In a manner known to those of ordinary skill in the field of engineering mechanics, the vector 117 can be "resolved" to two vector components 119 and 121, respectively. The component 119 represents output force (as to both magnitude and direction) and the component 121 represents lateral or shear force.

Figure 22:
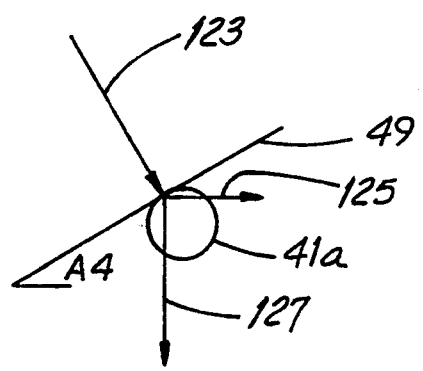

Referring to FIG. 22, it assumed that the groove 49 face is at an angle "A4" (which is less than angle "A1") and exerts a force on the component 41a, the magnitude and direction of such force being represented by the vector 123. It is to be noted that the lengths of vectors 117 and 123 are substantially identical which means that in each instance, the "starting forces" are the same. However, the output force as represented by vector component 125 is significantly less.

It is now apparent that output force can be changed by changing the angle analogous to angle "A1." In a highly preferred embodiment, such angle "A1" is at least about 45°.

Figure 23:
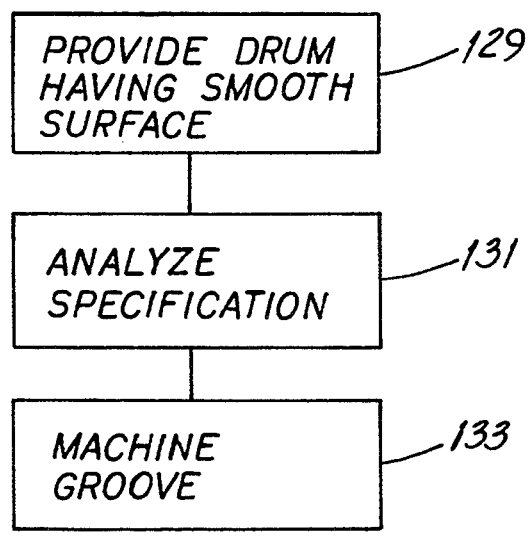
FIG. 23 is a chart illustrating steps of a new method for making a steering apparatus.

Other aspects of the invention involve a method for making a steering apparatus 10 having a cam portion 39 on a drum 27. Referring to FIG. 23, the method includes, in either order, the steps of providing a drum having a generally smooth surface (as represented by the symbol 129) and analyzing a specification describing a steering rate to be provided by the apparatus (symbol 131). A groove is then machined in the drum surface so that the rate of steering provided by the apparatus is in conformity with the specification. The symbol 133 represents this step.

To make a constant rate steering apparatus 10, the machining step includes machining the groove 39a so that such groove 39a is at a substantially constant angle (like angle "A1") to a reference line 51 which is (a) on the drum surface 43 and (b) parallel to the input axis 25. To make a variable rate steering apparatus, the machining step includes machining the groove 39a to have plural segments 113, 115 as shown in FIG. 8. Such machining is in a way that each segment 113, 115 is at a different angle (like angles "A2" and "A3") to an imaginary reference line 51a 51b which is on the drum surface 43 and parallel to the input axis 25.

From the foregoing, it is apparent that when the cam portion 39 is a groove 39a, such groove 39a can be machined on a smooth drum surface 43 to meet any of a variety of specifications of OEM customers. The tooling required to do so is modest. In contrast, when the cam portion 39 is a land 39b, it is virtually required that a new mold be developed for each customer specification. As is known to those skilled in the art of injection molding, a mold is a very expensive item of tooling.

While the principles of this invention have been described in connection with specific embodiments, it should be understood clearly that these descriptions are made only by way of example and are not intended to limit the scope of the invention.

What is claimed:

1. In an apparatus having an input device rotating about an input axis and an output device providing a force along a force axis, the improvement wherein:

the apparatus includes a drum having a spiral-shaped cam portion formed thereon, such cam portion extending not more than 720° around the drum;

input force is applied by the input device concentric with the input axis;

the devices are coupled together by a cam follower mechanism having a guide and a follower member mounted on the guide for coincident movement therewith;

the guide has a width spanning a relatively small portion of the circumference of the drum;

the guide has a pair of spaced, generally parallel rails extending therethrough and is coupled to a rigid, elongate control rod aligned with the rails; and the control rod moves along the force axis and is attached end-to-end to an elongate flexible control cable co-extensive with the force axis, the control cable operating in tension or compression depending upon the direction of rotation of the input device.

2. The apparatus of claim 1 wherein:
the drum is generally cylindrical;
the cam portion comprises a groove in the drum;
the follower member comprises a disc rotatably mounted to the guide and engaging the groove.

3. The apparatus of claim 1 wherein:
the drum is generally cylindrical;
the cam portion comprises a land on the drum;
the follower member comprises a follower straddling the land; and
the follower includes a pair of rigidly-mounted pins.

4. The apparatus of claim 1 wherein:
the input device includes a tapered drive shaft;
the mechanism includes a tapered drive socket; and
the shaft and the socket are conformably tapered for torque-transmitting shaft-socket engagement.

5. The apparatus of claim 1 wherein:
the input device includes a drive shaft;
the mechanism includes a drive socket;
the socket is in the drum; and
at least one key interlocks the shaft and the drum for preventing relative shaft-drum rotation.

6. The apparatus of claim 1 wherein:
the input device includes a drive shaft mounted on a support bracket for rotating movement; and
the rails are supported by the bracket.

7. The apparatus of claim 6 wherein:
the bracket has a pair of spaced legs; and the rails extend between the legs.

8. The apparatus of claim 7 including a support collar and wherein:

one of the support legs is substantially planar;

the input device is a wheel; and the wheel and the support collar are both adjacent to and on the same side of the planar leg.

9. The apparatus of claim 1 wherein the drum has a surface and a length and wherein:

the cam portion defines an included angle with a reference line on the surface, such reference line being parallel to and spaced from the input axis; and the angle is substantially constant along the length of the cam portion, whereby the apparatus provides constant rate steering.

10. The apparatus of claim 1 wherein the drum has a surface and a length and wherein:

the cam portion has a first segment defining a first included angle with a first reference line on the surface, such first reference line being parallel to and spaced from the input axis;

the cam portion has a second segment defining a second included angle with a second reference line on the surface, such second reference line being parallel to and spaced from the input axis; and the angles differ from one another, whereby the apparatus provides variable rate steering.

* * * * *